United States Patent
Dummett

(10) Patent No.: US 8,985,034 B2
(45) Date of Patent: Mar. 24, 2015

(54) TIMBER SUBSTITUTE

(75) Inventor: Laurence Walter Dummett, Point Frederik (AU)

(73) Assignee: Biofiba Innovations Pty Ltd (AU)

(*) Notice: Subject to any disclaimer, the term of this patent is extended or adjusted under 35 U.S.C. 154(b) by 0 days.

(21) Appl. No.: 13/375,333

(22) PCT Filed: Jun. 23, 2010

(86) PCT No.: PCT/AU2010/000794
§ 371 (c)(1), (2), (4) Date: Feb. 24, 2012

(87) PCT Pub. No.: WO2010/148451
PCT Pub. Date: Dec. 29, 2010

(65) Prior Publication Data
US 2012/0137937 A1 Jun. 7, 2012

(30) Foreign Application Priority Data
Jun. 25, 2009 (AU) .................. 2009902956

(51) Int. Cl.
*A47B 13/00* (2006.01)
*B29C 47/62* (2006.01)
(Continued)

(52) U.S. Cl.
CPC ............ *B29C 47/62* (2013.01); *B29C 47/0004* (2013.01); *B29C 47/0019* (2013.01); *C08J 5/10* (2013.01); *C08L 3/02* (2013.01); *B65D 19/0095* (2013.01); *B65D 65/466* (2013.01); *B29C 47/6012* (2013.01); *B29C 47/6018* (2013.01); *B29C 47/625* (2013.01); *B29C 70/523* (2013.01); *B29C 47/76* (2013.01); *B29C 47/94* (2013.01); *B29C 70/52* (2013.01); *B29K 2003/00* (2013.01); *B29K 2105/06* (2013.01); *B29L 2031/7178* (2013.01); *C08J 2303/02* (2013.01); *C08L 2201/06* (2013.01); *B65D 2519/00034* (2013.01); *B65D 2519/00039* (2013.01); *B65D 2519/00069* (2013.01); *B65D 2519/00074* (2013.01); *B65D 2519/00104* (2013.01); *B65D 2519/00109* (2013.01); *B65D 2519/00273* (2013.01); *B65D 2519/00293* (2013.01);
(Continued)

(58) Field of Classification Search
USPC .................. 108/901, 161; 106/162.51, 215.5, 106/215.4, 210.1
See application file for complete search history.

(56) References Cited

U.S. PATENT DOCUMENTS 3,638,586 A * 2/1972 Elshout ...................... 108/57.28
4,000,884 A    1/1977 Chung
(Continued)

FOREIGN PATENT DOCUMENTS

| CN | 101139453 | 3/2008 |
| DE | 19805925 A1 | 8/1999 |
| EP | 1719797 A1 | 11/2006 |

OTHER PUBLICATIONS

"International Application No. PCT/AU2010/000794, International Search Report mailed Apr. 19, 2011", 4 pgs.
(Continued)

*Primary Examiner* — Daniel Rohrhoff
(74) *Attorney, Agent, or Firm* — Schwegman Lundberg Woessner, P.A.

(57) ABSTRACT

An extrudable fused solid comprising a matrix which comprises starch and a plasticizer, and which has continuous fiber under tension disposed within the matrix. Further a process for producing the fused solid, and a pallet which is at least partially composed of the fused solid.

10 Claims, 2 Drawing Sheets

(51) Int. Cl.

| | | |
|---|---|---|
| B29C 47/00 | (2006.01) | |
| C08J 5/10 | (2006.01) | |
| C08L 3/02 | (2006.01) | |
| B65D 19/00 | (2006.01) | |
| B65D 65/46 | (2006.01) | |
| B29C 47/60 | (2006.01) | |
| B29C 70/52 | (2006.01) | |
| B29C 47/76 | (2006.01) | |
| B29C 47/94 | (2006.01) | |
| B29K 105/06 | (2006.01) | |
| B29L 31/00 | (2006.01) | |
| B29K 105/10 | (2006.01) | |

(52) U.S. Cl.
CPC ............... B65D2519/00298 (2013.01); B65D 2519/00323 (2013.01); B65D 2519/00333 (2013.01); B65D 2519/00373 (2013.01); B65D 2519/00562 (2013.01); B65D 2519/00572 (2013.01); B29K 2105/10 (2013.01); B29K 2803/00 (2013.01)
USPC ....................................... 108/161; 106/215.5

(56) References Cited

U.S. PATENT DOCUMENTS

| | | | |
|---|---|---|---|
| 4,173,445 | A | 11/1979 | McKelvey et al. |
| 4,357,291 | A | 11/1982 | Miller et al. |
| 5,139,843 | A * | 8/1992 | Murakami et al. ............ 428/116 |
| 5,316,578 | A | 5/1994 | Buehler et al. |
| 5,569,692 | A | 10/1996 | Bastioli et al. |
| 6,161,714 | A | 12/2000 | Matsuura et al. |
| 6,231,970 | B1 | 5/2001 | Andersen et al. |
| 6,299,246 | B1 | 10/2001 | Tomka |
| 6,833,097 | B2 | 12/2004 | Miyachi |
| 6,938,558 | B1 * | 9/2005 | Peres ........................... 108/56.3 |
| 7,384,993 | B2 | 6/2008 | Long et al. |
| 7,495,044 | B2 | 2/2009 | Long et al. |
| 2005/0027098 | A1 | 2/2005 | Hayes |
| 2006/0252901 | A1 * | 11/2006 | Narayan et al. ............... 527/300 |
| 2010/0159777 | A1 | 6/2010 | Wang et al. |

OTHER PUBLICATIONS

"International Application No. PCT/AU2010/000794, International Search Report mailed Jul. 29, 2010", 5 pgs.

"International Application No. PCT/AU2010/000794, Written Opinion mailed Jul. 29, 2010", 5 pgs.

Rutenberg, M. W., et al., "Chapter X: Starch Derivations: Production and Uses", Starch: Chemistry and Technology, Second Edition, Edited by Roy L. Whistler et al., Academic Press, Inc. (1984), 80 pgs.

"Chinese Application No. 201080028458.8, First Office Action mailed Sep. 30, 2013 [with English translation]", (Sep. 30, 2013), 9 pgs.

Li, "Material Forming Technology", Mechanical Industry Press of China, Edition 1 [with English translation], (Aug. 2000), 197-200.

"Chinese Application No. 201080028458.8, Second Office Action [with English translation] dated May 20, 2014", (May 20, 2014), 13 pgs.

Fowler, Paul A, et al., "Review: Biocomposites: technology, environmental credentials and market forces", J Sci Food Agric 86:1781-1789 (2006), (Jul. 17, 2006), 1781-1789.

Huang, Jiakang, et al., "", Composite Material Molding Technology, Chemical Industry Press, Edition 1, Jan. 1999, 2 pgs.

John, Maya Jacob, et al., "Review: Biofibres and biocomposites", Carbohydrate Polymers 71 (2008) 343-364, (Jun. 10, 2007), 343-364.

Mohanty, A. K., et al., "Biofibres, biodegradable polymers and biocomposites: An overview", Macromolecular Materials and Engineering 2000; 276:1-24, (2000), 1-24.

Romão, C., et al., "Single Filament Mechanical Characterisation of Hemp Fibres for Reinforcing of Composite Materials", Molecular Crystals and Liquid Crystals 2004; 418: 87-99, (2004), 87-99.

European Application No. 10791070.5, Extended Search Report mailed Oct. 28, 2014, 6 pgs.

Sumerak, J., et al., "Pultrusion", ASM Handbook vol. 21: Composites, ASM International, Materials Park, OH, (2001), 550-564.

* cited by examiner

Provided herein in a first aspect is a fused solid comprising a matrix which comprises starch and plasticizer, wherein continuous fibre is disposed under tension within the matrix. In certain embodiments the matrix further comprises one or more components selected from polyester, discontinuous fibre, non-fibre filler, foaming agent and oil. In particular embodiments the matrix is aerated.

TIMBER SUBSTITUTE

RELATED APPLICATION

This application is a national stage application under 35 U.S.C. §371 of PCT/AU2010/000794, filed Jun. 23, 2010 and published as WO 2010/148451 A1 on Dec. 29, 2010, which claims priority benefit from Australian provisional patent application. No. 2009902956 filed 25 Jun. 2009 entitled "Material and methods for producing same," which applications and publication are incorporated by reference as if reproduced herein and made a part hereof in their entirety, and the benefit of priority of each of which is claimed herein.

TECHNICAL FIELD

The present invention relates to a synthetic timber substitute material and the method of producing the material. The material has particular application in pallets, crates, boxes and other packaging materials.

BACKGROUND ART

In the field of goods transport, a pallet, dunnage platform or skid is a flat transport structure which supports goods in a stable fashion while being capable of being lifted by a forklift or other jacking device. Crates, boxes and slatted compartment are packaging containers which may be used in conjunction with pallets or as individual items which are capable of being lifted and transported in the same manner as pallets. Both pallets and crates may be made from either timber, plastic, polystyrene, composite plastic, cardboard, metal or composite materials.

Pallet and crate production may be divided into three main categories in order of volume of production, with the greatest production of one-way transport, single use pallets for export, fewer "in-country" warehouse-rackable reusable loop pallets and fewest product specific pallets, such as medical or food-specific pallets. The lack of a single international standard for the size and shape of pallets and crates causes substantial and ongoing expense in international trade. An international standard for all pallets is difficult to implement because of the wide variety of needs a standard pallet must satisfy, including the ability to pass through doorways of different standard dimensions, fitting in standard containers, and allowing low labour and handling costs specific to each country.

Accordingly, when a product is imported from another country it will be delivered on an export size pallet or crate, or on a pallet or crate made specifically the product. Typically the goods are transferred to a country-specific pallet once they have entered the country before shipping to the customer or being stored in a warehouse. In most cases the original export pallet will not be used for storage purposes as it will not be certified for storage purposes, for example because it does not comply with local safety standards. Thus in many cases the export pallets or crates have no other use, and are recycled, if possible, or chipped and sent to landfill as waste.

The timber pallet and crate fabrication industry takes up more than 40% of the world's consumption of natural timber from old growth and slow growth replanted forest. Six billion one-way single use timber export pallets or crates are produced and sold globally every year, with a resultant vast amount of timber being sent to waste each year.

Due to the International Plant Protection Convention (IPPC), most timber pallets or crates which are shipped across national borders must be made of materials which are incapable of being carriers of invasive species of insects or plant diseases. Pallets which are made of untreated wood must be treated in accordance with International Standards and must be certified prior to export or arrival by either heat treatment or chemical fumigation. These treatments introduce new characteristics into the untreated wood and create further disadvantages for the subsequent re-use or disposal of the pallets.

Accordingly there is a need for an alternative to wood which minimizes or alleviates at least some of the disadvantages discussed above.

SUMMARY OF THE INVENTION

Provided herein in a first aspect is a fused solid comprising a matrix which comprises starch and plasticizer, wherein continuous fibre is disposed under tension within the matrix. In certain embodiments the matrix further comprises one or more components selected from polyester, discontinuous fibre, non-fibre filler, foaming agent and oil. In particular embodiments the matrix is aerated.

In certain embodiments the starch is corn starch or a thermoplastic starch derived from corn starch.

In certain embodiments the plasticizer is selected from the group consisting of any one or more of a dihydric alcohol, a trihydric alcohol, a polyhydric alcohol, lecithin, triethyl citrate, ethylene glycol, propylene glycol, glycerol, a glycerol ester, erythritol, pentaerythritol, sorbitol, a poly glycerol and a poly glycerol ester.

In certain embodiments the continuous fibre consists of textile fibre, such as fibre from hemp or jute.

In particular embodiments the fused solid is biodegradable.

In another embodiment there is provided a process for producing a fused solid comprising:
providing a solidifyable liquid matrix which comprises starch and plasticizer, and extruding the liquid matrix and disposing therein continuous fibre such that the continuous fibre is surrounded by the liquid matrix, wherein the continuous fibrous substance is under tension, and
solidifying the liquid matrix with the continuous fibre disposed therein under tension to produce the fused solid.

In certain embodiments the continuous fibre is disposed under tension within the liquid matrix by pultrusion.

In certain embodiments the step of providing a solidifyable liquid matrix comprises combining starch and plasticizer and heating to produce a liquid matrix, for example using a screw extruder.

In another embodiment, there is provided a pallet comprising a plurality of top deck boards, a plurality of bottom deck boards and plurality of runners, wherein at least one of the plurality of top deck boards, the plurality of bottom deck boards and the plurality of runners is composed of the fused solid according to the first embodiment.

BRIEF DESCRIPTION OF THE DRAWINGS

Certain embodiments of the present invention will now be described, including by way of examples, with reference to the accompanying drawings wherein.

DESCRIPTION OF EMBODIMENTS

Figure 1:
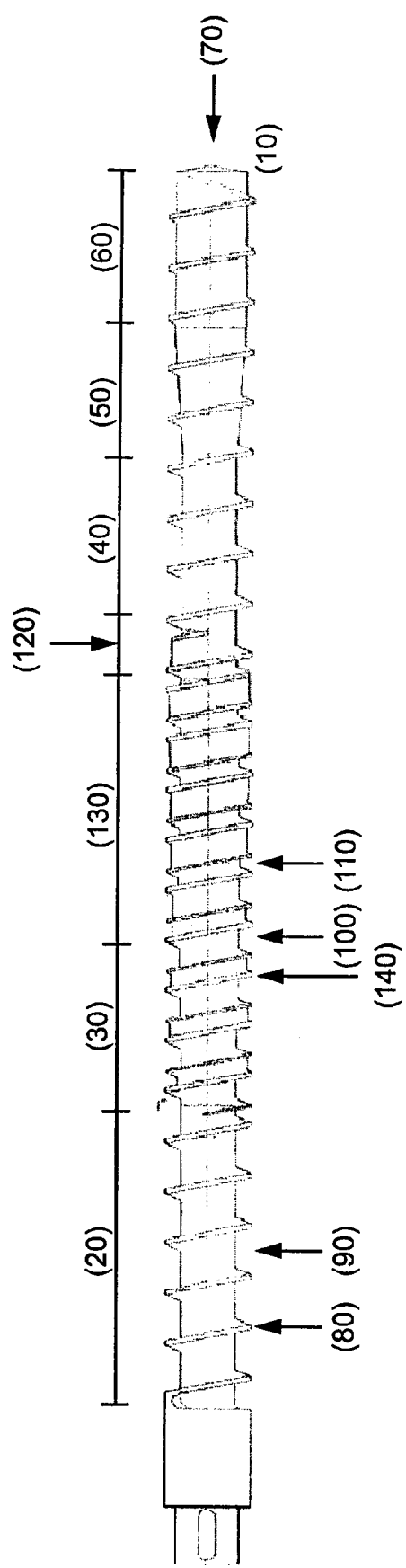
FIG. 1 is a diagram illustrating an extrusion screw (10) for use in a process for producing a fused solid.

Described herein is an extrudable fused solid comprising a matrix, the fused solid being reinforced with continuous fibre under tension, the fused solid being able to be produced as a monolith and being suitable particularly for use in the export pallet industry. Also described herein are methods of producing said fused solid, and a pallet which comprises components made from fused solid.

Fused Solid

In a first aspect there is provided a fused solid comprising a matrix comprising starch and plasticizer, wherein continuous fibre is disposed under tension within the matrix.

A "fused solid" as referred to herein is solid material comprising a matrix and continuous fibre. The matrix may be a product of chemical reactions which take place when the components of the matrix are mixed and subjected to elevated pressure and/or temperature. Chemical reactions which may take place in the formation of the matrix include, but are not necessarily limited to any one or more of etherification, esterification, acetylation, hydrolysation and condensation.

The fused solid described herein may be provided in monolithic form, such as in the form of planks, panels or boards, rods or other forms with a variety of cross sections. The monolithic form may have a constant cross section. Typically a fused solid in monolithic form is produced by a process which comprises extrusion of the monolith, and not principally by pressure forming techniques.

In certain embodiments the matrix of the fused solid is an aerated matrix. In an aerated solid the overall density of the matrix material of the solid is reduced by the introduction of a plurality of gas bubbles distributed throughout at least part of the fused solid matrix during production of the fused solid so that the structure of the matrix of the fused solid resembles a foam. The foam may be a closed cell foam. The foam may be an open cell foam. The gas bubbles may be air or may be one or more other gases as described herein or as known in the art.

In certain embodiments the fused solid is degradable. As used herein the term "degradable" refers to the ability of the fused solid to be broken down by the action of an environmental agent. The environmental agent may be living organisms, such as bacteria and/or fungi, or typically enzymes secreted by or obtained from such organisms, in which case the fused solid is biodegradable. In certain embodiments, the fused solid is more biodegradable than solid wood, for example more rapidly biodegradable. In certain embodiments, the fused solid may be hydro-biodegradable and/or photo-biodegradable. In certain embodiments the fused solid may be compostable or degradable upon contact with seawater or upon exposure to activated sludge. In certain embodiments the fused solid is completely biodegradable, ie biodegradable without leaving behind non-biodegradable residues.

The fused solid may be treated with a surface treatment to modify the surface properties of the fused solid. For example, the surface of the fused solid may be sealed or impregnated with a water repellent or water resistant material in order to reduce the rate at which water penetrates the surface of the fused solid and thereby extending the life of the fused solid in environments in which moisture exposure is expected. The surface of the fused solid may be sealed or impregnated with an oil-resistant coating to reduce the absorption of possibly toxic hydrophobic materials, such as oil residues left by machinery, which may reduce the ability of the fused solid to be biodegraded to a non-toxic residue.

The surface treatment may be a surface coating, such as a paint or a polymer coating. In certain embodiments the surface treatment is an oil treatment with a biodegradable oil, such as a vegetable oil. Suitable oils include dammar oil, linseed oil, canola oil, castor oil, sunflower oil, olive oil, cotton seed oil and so on.

Matrix

The matrix of the fused solid described herein comprises starch. Starch comprises a mixture of polymers, including the unbranched linear polymer amylose and the branched polymer amylopectin. Starch may be obtained from a variety of plant sources, for example tapioca starch, potato starch, gramineae starch, corn or maize starch, wheat starch, rice starch, legume starch, or combinations of two or more thereof. In certain embodiments, the starch will have an amylose content of greater than 50%, greater than 60%, greater than 70%, greater than 80% or greater than 90% by weight. In certain embodiments the starch is chemically modified. For example, starch may be derivatized or modified by typical processes known in the art. These processes may include esterification, etherification, oxidation, acid hydrolysis, crosslinking and enzyme conversion. Typically, modified starches include esters, such as the acetate and half-esters of dicarboxylic acids, particularly the alkylsuccinic acids; ethers, such as the hydroxyethyl and hydroxypropyl starches and cationic starches such as starch modified with 2-diethylaminoethyl chloride (DEC) and starch modified with quaternary ammonium reagents such as 3-chloro-2-hydroxypropyltrimethylammonium chloride; starches oxidized with hypochlorite; starches reacted with crosslinking agents such as phosphorus oxychloride, epichlorohydrin, and phosphate derivatives prepared by reaction with sodium or potassium orthophosphate or tripolyphosphate and combinations thereof. These and other conventional modifications of starch are described in publications such as "Starch: Chemistry and Technology", Second Edition, Edited by Roy L. Whistler, et al., Chapter X; Starch Derivations: Production and Uses by M. W. Rutenberg, et al., Academic Press, Inc., (1984).

Typically the starch is a thermoplastic starch. A thermoplastic starch is a starch which liquefies as the starch crystal structure is disrupted when heated, and which subsequently solidifies into a flexible and deformable solid material when sufficiently cooled. It may be advantageous for a thermoplastic starch to be a high amylose form of starch. Typically the thermoplastic starch is a modified form of native starch. Native starch may be made more thermoplastic by gelatinization, for example by the application of heat and optionally pressure. Native starch may be made more thermoplastic by the addition of a plasticizer to increase the flexibility of the melted and solidified material, and/or via direct chemical modification of the starch molecules. In certain embodiments, a non-thermoplastic starch may be used in the preparation of the fused solid if it becomes thermoplastic during the formation of the fused solid. Thermoplastic starches are available from a variety of commercial sources, for example Cereloy™ which is obtainable from Cerestech, Inc. An example of direct chemical modification of starch to form a thermoplastic starch includes, but is not necessarily limited to hydroxypropylation. Hydroxypropylated high amylose starch designated A939 is commercially provided by Goodman Fielder. Other modifications to starch to form a thermoplastic starch material having a starch modified to include a hydroxyalkyl C2-6 group are described, for example, in U.S. Pat. No. 7,384,993 (Plantic Technologies, Inc), the entire contents of which is incorporated herein by reference, or hydroxyether substitutions formed using hydroxyethyl or hydroxybutyl groups, or ester derivatives produced using anhydrides such as maleic phthalic or octenyl succinic anhydride. The degree of substitution (the average number of hydroxyl groups in a unit that are substituted) is preferably about 0.05 to 2.

Typically the thermoplastic starch is provided at a concentration of greater than about 10% of the total reactant mixture of the matrix of the fused solid (ie. greater than about 10% of the total weight of all the starting components of the matrix of the fused solid, including any water which is added to the starting components) and more typically greater than about 50% by weight of the total reactant mixture of the matrix of the fused solid. In certain embodiments the starch or thermoplastic starch is provided at greater than about 60% of the total reactant mixture which forms the matrix of the fused solid.

Typically the starch is provided to the reactant mixture in the form of a powder or as granules, or as a suspension or slurry.

The matrix of the fused solid described herein comprises one or more plasticizers, that may be used to manipulate the mechanical properties of the fused solid, for example to reduce the brittleness of the fused solid matrix, and/or increase homogeneity of the fused solid matrix, and/or increased the fluidity of the melted fused solid matrix and/or increase the flexibility of the fused solid matrix. In certain embodiments, the plasticizer is biodegradable.

Typical plasticizers are dihydric, trihydric or polyhydric alcohols, and their derivatives. Examples of suitable plasticizers are any one or more of lecithin, triethyl citrate, ethylene glycol, propylene glycol, glycerol, glycerol esters, erythritol, pentaerythritol and sorbitol or plasticizers with a higher molecular weight such as poly glycerol and poly glycerol esters. Examples of suitable glycerol esters include glycerol monoacetate, diacetate, and triacetate.

The amount of the plasticizer which is provided may be in the range of from 0.5% to 30% by weight of the total reactant mixture; ie from 0.5% to 30% of the total weight of all of the starting components of matrix of the fused solid, including any water which is added to the starting components. Typically the plasticizer is provided in the range of from 15 to 30% by weight of the total reactant mixture.

In certain embodiments, the matrix of the fused solid may comprise a polyester. The addition of polyester may increase the degradability of the fused solid matrix and/or may act as a binder for the matrix and/or may provide cross-linking of other components to provide an increase in impact strength of the fused solid. The polyester may be an aliphatic polyester. The polyester may be an aromatic polyester. In certain embodiments the polyester is a biodegradable polyester. Many polyesters are readily biodegradable and under optimum conditions can reach close to 100% biodegradation. In certain embodiments the aliphatic polyester is selected from an aliphatic polyester which is soluble in water, such as a polylactic acid, a polyglycolic acid, a polybutylene succinate or a combination thereof.

Examples of suitable polyesters include polyester selected from the group consisting of poly(caprolactone)(PCL), poly(lactic acid) or polylactide (PLA), poly(glycolic acid) or polyglycolide (PGA), poly(betahydroxyalkanoates) (PHA), and aliphatic-aromatic copolyesters, such as polybutylene adipate coterphthalate (PBAT), and mixtures of two or more thereof.

The polyester is typically provided in an amount ranging from 0% to about 30% by weight of the total reactant mixture.

In certain embodiments, the matrix of the fused solid described herein is an aerated matrix, and the fused solid is an aerated fused solid. The term aerated as used herein refers to the structure of the matrix of the fused solid in which gas bubbles are introduced into the matrix of the fused solid during the process of formation of the matrix. The introduction of gas bubbles within the matrix of the fused solid results in a fused solid with a reduced density when compared to non-aerated fused solid, and may also contribute to the degradability of the fused solid by increasing the surface area of the fused solid which is available to attack by degrading enzymes or other degrading stimuli. In certain embodiments the density of the aerated fused solid is typically in the range of from about 200 to 1100 kg/m$^3$. More typically the density of the aerated fused solid is in the range of from about 400 to 800 kg/m$^3$. In certain embodiments the aerated fused solid does not have substantially adverse mechanical properties when compared to a non-aerated fused solid material. The mechanical properties which are not substantially adversely affected may include any one or more of resistance to compression, resistance to impact, resistance to tension or recovery from flexion.

The aeration of the matrix of the fused solid may be achieved by a variety of techniques which are available in the art. These include, but are not necessarily limited to the use of a decomposition foaming agent which produces gas on exposure to particular conditions, such as sodium bicarbonate which produces carbon dioxide gas on exposure to an acid. The decomposition foaming agent may be a carbonate, a bicarbonate, a nitrate, an alkali borohydride, peroxide, urea or azo compound. The foaming agent may be a volatile foaming agent which is introduced to the matrix and which evaporates or expands into a gas on heating and/or reduction of pressure. In certain embodiments the foaming agent is selected from, but not limited to, water or steam, carbon dioxide, nitrogen or any combination thereof. In certain embodiments the volatile foaming agent comprises a gas which is in combination with any one or more of a C1 to C5 compound, n-pentane, isopentane, n-butane and propane or a halogenated, and in particular a fluorinated hydrocarbon. The volatile foaming agent may be a volatile hydrocarbon such as methane, ethane and butane, a fluorocarbon compound and or an organic solvent such as ethanol or methanol.

The production of an aerated fused solid may involve the application of heat, pressure, acidity or vacuum to cause the foaming agent to evenly foam and create gas bubbles in the matrix of the fused solid. The size and density of gas bubbles may be varied by varying the concentration of foaming agent, and/or by controlling the process step such as the temperature and/or pressure in which the agent is added or activated.

The components of the fused solid may contain different amounts of water at different stages of the process for producing the fused solid. The amount of water present in the fused solid may be controlled by the addition or venting of water at one or more steps of the process or by controlling evaporation using heat and the application of steam during the formation of the fused solid. Water may be added to the components of the fused solid matrix during production of the fused solid as liquid water, as steam, or in the form of a water-containing hydrogel, such as a methacrylate hydrogel. The final concentration of water in the matrix of the fused solid may be from 0% to about 15%, more typically from about 1% to 10%, and even more typically from about 1% to 5%.

In certain embodiments, the matrix of the fused solid comprises an oil. The oil may reduce the viscosity of the mixture of components making up the liquid matrix prior to the formation of the fused solid and may reduce the friction of the liquid matrix and/or fused solid as it passes though the process for fused solid production. The oil may be selected from, but is not necessarily limited to oils of plant or animal origin. In certain embodiments the oil is a biodegradable oil, typically canola oil. Other suitable oils may include dammar oil, linseed oil, castor oil, sunflower oil, olive oil, cotton seed oil and so on.

In certain embodiments the matrix of the fused solid comprises discontinuous fibre in addition to continuous fibre. The discontinuous fibre may act as a filler to increase the bulk of the fused solid while reducing the proportion of more expensive components of the matrix, and may also assist in reducing brittleness, improving stiffness or modifying other mechanical properties of the fused solid. The discontinuous fibre may be provided in an amount of from 0% to about 80% by weight of the total reactant mixture, and typically from about 20 to 40% by weight of the total reactant mixture. Typically, the density of discontinuous fibrous substance which may be used in the fused solid is 400 kg/m$^3$.

The discontinuous fibre may be a textile fibre. The textile fibre may be the same material as the textile fibre used to form the continuous fibre, or it may be a different material. The discontinuous fibre may be a material of plant origin, including cotton, wood, flax, abaca, sisal, ramie, jute or hemp origin. The discontinuous fibre may be hemp bast fiber or hemp pulp (hurd) fibre. The term "hurd" refers to the inner fibrous core of the hemp plant which may be separated from the cortical bast fibres of the hemp plant. The term "bast" refers to fibres of the cortical bark of the hemp plant. In certain embodiments the discontinuous fibre is a synthetic fibre, such as a glass or carbon fibre or a synthetic organic fibre.

The fused solid may comprise discontinuous fibre which is a mixture of fibres of different material and/or fibres of different lengths, such as a mixture of any two or more of fibres of plant origin such as cotton, wood, flax, abaca, sisal, ramie, jute, Kenaf (*Hibiscus cannabininus*) or hemp origin. For example the discontinuous fibre may comprise a mixture of hemp bast and hemp hurd fibres, or a hemp bast and/or hurd fibres with other discontinuous fibres. The use of hemp bast and/or hurd fibres may be advantageous, as they are readily biodegradable, may assist in reducing the final density of the fused solid material, and may be obtained at a relatively low cost.

Typically the discontinuous fibre is disposed within the matrix in random orientations. In certain embodiments the discontinuous fibre is at least partially oriented, for example following combing of the matrix.

Typically the discontinuous fibre has an aspect ratio of at least about 3:1, more typically at least about 10:1, more typically at least about 20:1 and more typically at least about 30:1. The maximum aspect ratio of the discontinuous fibre may be 100:1, and more typically 50:1. In certain embodiments the discontinuous fibres have a length of from about 3 to 25 mm. In certain embodiments the discontinuous fibres have a length of from about 4 to 12 mm.

The matrix of the fused solid may comprise one or more fillers in addition to or instead of discontinuous fibre. A filler may be a non-fibre filler. The non-fibre filler may comprise a clay, a silica, calcium carbonate, carbon black or other fillers which are known in the art. In certain embodiments the filler is a biodegradable filler, or does not otherwise interfere with the biodegradability of the matrix.

Continuous Fibre of the Fused Solid

The fused solid comprises continuous fibre, wherein the continuous fibre is disposed under tension within the matrix. The continuous fibre typically acts to reinforce the fused solid and may provide other improved structural properties to the fused solid.

The continuous fibre will typically comprise a plurality of smaller fibres which are arranged so that they form a continuous string, yarn or cord. Typically the fibres will be spun into a string or cord which forms the continuous fibre. The continuous fibre may be single ply or may be multiple plies. The continuous fibre may be arranged into string, yarn or cord, which in turn in some embodiments may be arranged into larger structures. For example, the continuous fibre may be arranged into braided material, or into woven material, or into knitted material, or into a knotted material. The continuous fibre may be provided, for example, in the form of meshes or nets.

Typically, the fibres making up the continuous fibre are textile fibres, such as animal textile fibres such as wool, or plant textile fibres such as cotton, hemp, ramie, flax, jute, Kenaf (*Hibiscus cannabininus*), manila hemp, sisal hemp or any combinations of two or more thereof. In one embodiment, the continuous fibre comprises hemp fibres, typically hemp fibres from Cannabis sativa. The hemp fibres typically may be hemp bast fiber and/or hemp pulp (hurd) fibre. Advantageous characteristics of hemp fibres for use in the fused solid include their light weight (low density), high rigidity, high thermal resistance and biodegradability. In other embodiments, particularly in embodiments in which degradability is not required, the continuous fibre comprises synthetic fibres such as aramids, rayon, nylon, carbon fibre, glass fibre or mineral fibres.

Typically the cross sectional area of individual strings of the continuous fibre will be in the range of from about 0.5 mm$^2$ to 10 mm$^2$, more typically 1 mm$^2$ to 10 mm$^2$. Typically, the density of the continuous fibre will be in the range of about 400 kg/m$^3$ to 1200 kg/m$^3$. Typically, where the continuous fibre comprises strands of knitted, braided, woven, spun or knotted strings, each of the stands will have a cross sectional area of from about 15 mm$^2$ to 60 mm$^2$.

The continuous fibre is "continuous" in that the fibre is disposed in a continuous length along at least one complete dimension of the material, for example along at least one of the complete length or width or height of the fused solid. In certain embodiments, the continuous fibre is disposed along the complete length of at least 2 dimensions, for example where the continuous fibre is provided in the form of a mesh or net or in a woven form. In certain embodiments the continuous fibre is disposed along the complete length of all three dimensions. In certain embodiments the continuous fibre is disposed along the complete length of one dimension and incompletely along the length of one or two other dimensions of the fused solid.

The fused solid may comprise a single strand of continuous fibre disposed along a single dimension within the fused solid. The fused solid may comprise a plurality of strands of continuous fibre disposed along a single dimension. Typically strands of continuous fibre run parallel with one dimension of the fused solid. The continuous fibre may lie at a single depth or may lie at a plurality of depths and spacing when examining the cross-section of the fused solid perpendicular to the length of the continuous fibre. The continuous fibre may be completely surrounded by the matrix of the fused solid. The continuous fibre may be partially exposed at the surface of the fused solid.

Typically, a plurality of strands of continuous fibre will be disposed within a cross sectional area of the fused solid. For example, the plurality of strands of the continuous fibre may be spaced about 18 to 22 mm apart, measured from the centre points of adjacent strands, throughout the cross section of the fused solid.

For example, a fused solid with the cross sectional dimensions of 125 mm by 18 mm will typically contain about 5 strands of continuous fibre in each cross section. The centre of each of these strands of continuous fibre typically will be at least 9 mm from the surface of the fused solid when examined in cross section. In an example fused solid with the cross sectional dimensions of 125 mm by 18 mm (a cross sectional area of 2250 mm$^2$) in which the cross sectional diameter of each of the strands of the continuous fibre is about 8 mm, there is a total continuous fibre cross-sectional area of approximately 250 mm².

The continuous fibre is disposed under tension within the matrix of the fused solid while the matrix is in liquid form. In certain embodiments, prior to the continuous fibre being disposed into the matrix, the continuous fibre is passed through a liquid solution to dampen the substance of the fibre, for example to encourage closer incorporation between the continuous fibre and the liquid form of the matrix of the fused solid. The liquid solution may be a liquid solution of components of the matrix of the fused solid.

In certain embodiments, the continuous fibre is substantially dehydrated prior to being disposed within the matrix of the fused solid. Substantial dehydration may, for example, be achieved using an oven or microwave or through the use of a desiccant. Substantial dehydration of the continuous fibre may encourage the continuous fibre to exhibit a larger surface area as fibres making up the continuous fibre may stand proud of the surface of the continuous fibre, and thus may provide an enhanced interaction with the liquid form of the matrix.

In certain embodiments, the continuous fibre is disposed in the matrix of the fused solid using pultrusion.

The continuous fibre is disposed under tension in the fused solid. The tension may be applied to the continuous fibre by a pulley system. Typically, a spring loaded axle is programmed to control the tension. In certain embodiments, hydraulically operated rams acting via a tensioning sprocket will maintain a constant tension on each of the strands of the continuous fibre. By applying tension to the continuous fibre, their parallel arrangement and alignment within the fused solid may be assisted. The fused solid may possess greater rigidity and strength by fusing the liquid matrix while the continuous fibre is under tension.

Process for Producing a Fused Solid

In a second aspect there is provided a process for producing a fused solid which comprises a matrix and a continuous fibre disposed under tension within the matrix, the method comprising:

providing a solidifyable liquid matrix which comprises starch and plasticizer, extruding the liquid matrix and disposing therein continuous fibre such that the continuous fibre is surrounded by the liquid matrix, wherein the continuous fibre is under tension, and solidifying the liquid matrix with the continuous fibre disposed therein under tension to form the fused solid.

The liquid matrix comprises a starch and plasticizer. The starch and plasticizer are as described in the first aspect of the invention.

In certain embodiments the liquid matrix comprises a polyester as described in the first aspect of the invention. In certain embodiments the liquid matrix comprises discontinuous fibre as described in the first aspect of the invention. In certain embodiments the liquid matrix comprises an oil as described in the first aspect of the invention.

In certain embodiments the liquid matrix comprises water as described in the first aspect of the invention. In certain embodiments the liquid matrix comprises a foaming agent as described in the first aspect of the invention.

Typically when each of the components for the matrix of the fused solid are provided in solid form they will be provided in powdered or pellet form and combined with the other components. The components may be mixed in dry form or in a slurry following the addition of water. Where components in addition to starch and plasticizer are used, these may be combined with the starch and plasticizer or added after combining the starch and plasticizer and before heating these materials to form the liquid matrix.

The components may be pre-mixed in a kneader or mixer prior to heating the components to produce a liquid matrix, or they may be combined without premixing. The liquid matrix may become liquid by melting one or more components. The liquid matrix may become liquid by the addition of a liquid component.

The components of the matrix of the fused solid may be subjected to pressure and elevated temperature to form the liquid matrix. The liquid matrix is typically a shear-thickening (dilatant) liquid which is inherently sufficiently viscous that it will substantially retain its shape in monolithic form on leaving an extruder, allowing for subsequent shaping or molding of the extruded liquid matrix, while also being sufficiently liquid to allow the disposition of the continuous fibre within the liquid matrix. Ideally the components of the liquid matrix are uniformly melted and uniformly mixed.

Typically the components of the matrix are combined and melted under pressure using a screw extruder. Screw extruders typically have a plurality of regions of temperature control and one or more zones set by the configuration of the screw or screws which modulate the pressure exerted on the components. The screw extruder may be a single screw extruder or a twin screw extruder. For twin screw extruders the screws may be counter rotating or co-rotating. The screws may be intermeshing. The screws may be non-intermeshing. The screw design may provide conveying elements, in forward and/or reverse directions. The screw design may provide kneading elements. Examples of the use of screw extruders in the preparation of starch containing matrices are described, for example in European patent application publication No. EP 1719797 A1 entitled "Starch-vegetable oil graft copolymers and their biofiber composites, and a process for their manufacture".

Typically screw extruders have a housing which holds a rotatably mounted helical screw along an axis of an internal barrel portion. At the rear end of the barrel portion of the extruder there is an opening for feeding the components of the matrix to be extruded into the rear portion of the screw. The components may be fed from a hopper into the rear portion of the screw. The rotation of the screw within the internal barrel portion combines the components under pressure and controlled temperature, and gradually feeds the combined components towards the front end of the screw from which the liquid matrix may be extruded.

Examples of patents disclosing extruder screws include U.S. Pat. No. 4,357,291 (Miller et al.) which discloses an extruder screw having a feed section, a metering section and a second metering section. Different, substantially constant depth channels are provided within the respective sections. U.S. Pat. No. 4,173,445 (McKelvey et al.) discloses an extruder screw with a channel depth which constantly decreases from a feeding section to a metering section and which can be used at elevated temperatures for extended periods of time while being able to retain desired mechanical characteristics of the melted product at elevated temperatures.

An extruder screw is disclosed in U.S. Pat. No. 4,000,884 (Chung). This patent discloses an extruder screw including a feeding section connected to a melting section having a double helix design with a constantly decreasing solids channel profile and a constantly increasing melt channel profile, and a transition section which decreases the final melt channel depth continuously to a relatively small depth which is maintained constant in a metering section.

Screw extruders of the type described in any one of the abovementioned patents, the contents of which are incorporated herein by reference, may be suitable for use in the process described herein for producing the fused solid. A screw extruder which illustrates features suitable for the production of a liquid matrix for the fused solid is described below and illustrated in FIG. 1. Although the description below provides one particular example of an extrusion screw which is suitable for use in the formation of the liquid matrix, it is to be understood that other extruder screw designs which conform to the basic extruder screw design parameters herein may also be suitable.

The present extruder employs a high rate of rotational speed of the extruder screw in combination with a relatively low compression ratio and a high volume rate of flow through the compression section in order to effectively extrude the low melt, high viscosity liquid matrix in an aerated form to produce a fused solid with a resulting specific gravity ranging from about 0.5 to 0.8. Some of the parameters of the screw extruder which may be optimized to produce the liquid matrix include the control of the channel depths, the compression ratio and the rate of rotation of the extruder screw.

The extruder screw (10) includes a feed section (20), a barrier section (30), a transition section (130), a relief section (120), a vent section (40) which comprises a vent outside the barrel (not shown), a compression section (50) and a metering section (60) located in a barrel. Ideally the liquid matrix is uniformly moved along the extruder screw channels without substantial backflow or without flow over the screw flights (80), unless intended, in order to produce an acceptable extrusion pressure and a constant flow of liquid matrix.

A mixture of the components of the matrix of the fused solid may be delivered to the feed section through an inlet and passed progressively through the sections by rotation of the screw by a suitable motor in a known and controlled manner. The components of the matrix are fed into the extruder screw (10) in the feed section (20), melted in the barrier section (30) of the screw and vapour such as volatiles or steam arising from the melted components is vented out of the barrel in the vent section (40). The melted components are then compressed in the compression (50) and the metering (60) sections. In embodiments where the fused solid is an aerated fused solid, the aeration of the liquid matrix occurs in the compression section (50).

Ultimately the liquid matrix is delivered at the exit end (70) from the metering section through a die (not shown) for formation into the desired shape. It may be advantageous if a high pressure output is obtained by the extruder in order that the liquid matrix is forced through a die head prior to calibration and formation.

In the embodiment described herein, the extruder screw has a nominal diameter of 25 mm. The feed section of the screw comprises a helical flight having a width of 12 mm and an angle to the vertical of approximately 18°. The flight diameter is 25 mm. This flight diameter and the angle remain constant throughout the entire length of the screw. Typically, the concentricity of the root diameter of the channels to the outside flight diameter is within 0.15 mm, more typically within 0.12 mm. In the feed section the channel depth is maintained constant at 5 mm. Typically the temperature in the feed section will be in the range of from about 120° C. to 150° C. The feed section is connected to the barrier section where the matrix components are melted.

In the example described herein, the barrier section of the screw is composed of a double helix with a constant depth melt channel (100) and decreasing depth solids channel (110) adjacent to the melt channel. The flight between the melt and solids channels of the barrier section permits flow of the material from the solids channel to the melt channel. Typically the melt channel will have a constant depth of 5 mm for ensuring proper operation of the extruder screw for extruding the liquid matrix. The temperature in the barrier section may be in the range of from about 150° C. to 180° C. The barrier flight (140) runs out in the barrier section (30) such that the materials remaining in the melt channel and the solids channel are co-mingled. The melt channel gradually tapers from 5 mm to 4 mm in the transition section (130) beginning after the barrier flight has run out to a downstream location. At this location a combined channel of the melt and solids channels runs out into a relief section (120). In the relief section the combined channel depth gradually increases from 4 mm to 5 mm which latter depth is maintained constant in the vent section. In the relief and vent sections, the liquid matrix is subjected to sub ambient pressure to remove volatiles and to ensure proper venting of the liquid matrix.

A double helix design, for example as illustrated in FIG. 1, may be advantageous to provide for proper melting of the matrix. It should be understood, however, that it may be possible to effectively melt the matrix components without the double helix design if the barrier section is substantially increased in length. It should also be understood that the dimensions and configuration of the barrier section may be designed to accommodate the rheology of the liquid matrix and to properly urge the liquid matrix to flow through the barrier section at an appropriate rate.

The dimensions within the barrier section are preferably tightly controlled and the surfaces machined to exacting dimensions with a tolerance range of 0.01%+/− of the dimensions specified in order to properly vent the liquid matrix and to ensure a smooth, continuous flow of the material through the channel of the extruder screw. Typically the temperature in the vent section will be in the range of from about 180° C. to 200° C. By carefully controlling the transition from the barrier section to the vent section, the uniformity and continued movement of the melted components is further enhanced.

The vent section (40) is connected to the compression section (50). Typically the temperature in the compression section will be in the range of from about 160° C. to 180° C. The relative depths of the channels in the compression section may have tolerances of 0.01%+/− of the specified tolerances to influence on the operation of the extruder screw. The initial channel depth of the compression section is approximately 40% of the outer radius of the screw. The final channel depth of the compression section is approximately 16% of the outer screw radius. In certain embodiments the initial channel depth is 5 mm, and the final channel depth is 2 mm. Typically the extruder screw has a relatively small ratio of compression which may be in the order of 2.0:1 to 2.5:1, and is most preferably approximately 2.5:1. Ideally the initial depth of the channels in the compression section is made as large as possible without affecting the strength of the extruder screw, and may be comparatively large relative to standard extruder screw designs. A relatively large volume of flow as compared with conventional extruders is provided through the compression section. The large volume flow is obtained by providing a relatively great depth initial channel in the compression section and also providing a relatively low compression ratio within that section while rotating the screw at a high rate of speed. In certain embodiments the volume of flow will be in the range of from about 4 000 $cm^3$ to 50 000 $cm^3$ per minute. In certain embodiments the volume of flow will be in the range of from about 6 750 $cm^3$ to 11 250 $cm^3$ per minute. The deep channel depth in the initial portion of the compression section and a relatively small compression ratio, typically 2.5:1, provided in the compression section cooperate to enhance forward movement of the liquid matrix with less backflow or flow over the extruder screw flight. If the compression ratio is too great, problems of surging are more likely to occur.

After passing from the compression section the compressed material is passed through a metering section (60) having a constant channel depth of 2 mm. Typically the temperature in the metering section will be in the range of from about 150° C. to 170° C. After passing through the metering section the material is passed through a breaker plate and a die.

Ideally the liquid matrix emanating from the extruder screw will be at a sufficiently high pressure to be passed through the die without causing undue back pressure within the metering section. In certain embodiments pressures of from about 500 $kg/m^2$ to about 900 $kg/m^2$, and in particular embodiments pressures of from about 800 $kg/m^2$ to about 900 $kg/m^2$ have been found to be sufficient. In order to obtain these pressures with the relatively low compression ratio employed in the compression section it may be advantageous that the screw is rotated at a speed which is substantially higher than the speed of rotation of extruder screws for plastic polymer materials.

The extruder screw is rotated at a rate which is sufficient to produce a high pressure discharge of liquid matrix leaving the compression and metering sections. An electric motor driving arrangement is provided for rotating the screw. The speed of the rotating screw may be controlled through a variable speed programmable logical controlled gear box. Variable speeds may be advantageous to control the volume being extruded and speed may be governed by the cross sectional area of liquid matrix being extruded. In certain embodiments, the extruder screw is rotated in the range of from about 50 to 250 rpm. Typically, the screw is rotated at a speed of from about 100 to 140 rpm, and more typically at 120 rpm. Lower operating speeds reduce the output but are believed to be economically feasible. In certain embodiments, the surfaces of the screw must be smooth in order to effectively move the liquid matrix along the screw channel. Typically, the surface of the screw is machined to a fine ground mirror finish. The surfaces of the screw are hard chrome-plated to enhance the flow of the liquid matrix through the screw extruder.

It is the combination of ensuring uniform melting and movement of the polymer in the barrier section and providing a relatively low compression ratio with a relatively large volume flow and rotating the screw at a high rate of speed which produces the high pressure and effective extrusion of the liquid matrix.

At the front end of the screw the liquid matrix is extruded through the head of the extruder. As used herein, the term 'breaker plate' refers to a plate inside the extruder head just prior to the extrusion die. Typically, in order to obtain complete mixing, the combined components will be contained within the screw area by a breaker plate. The breaker plate may be used to form the shape of the fused solid and in non-limiting examples may contain apertures of any one of trapezoids, triangles, quadrangles and rectangles, or any combination thereof.

The liquid matrix may be passed through an extrusion die to create a specific product shape. The product shape may be determined by the breaker plate. The product shape may be determined by the extrusion die. The product shape may be determined by the breaker plate and the extrusion die. The extrusion die may comprise guides and/or forms which allow the extrusion of two or more identical or non-identical shaped sections simultaneously. The inner face of the die may be Teflon™ coated to reduce friction of the liquid matrix. The temperature in the extrusion die zone of the extruder may be in the range of from about 160° C. to 180° C. In other embodiments the temperature in the extrusion die zone of the extruder may be in the range of from about 90° C. to 180° C., such as 90° C. to 120° C. The extruded and shaped articles exhibit smooth surface characteristics, which may in part be due to the depth of channel in the feeding section, and the constantly decreasing depth channel in the transition section.

The liquid matrix may be extruded in the form of fine cylinders for pelletization and drying of the matrix material. Pelleted matrix may be stored and remelted in a screw extruder when forming a final extruded article. Alternatively, the liquid matrix may be extruded in a monolithic form for production of articles, such as planks or boards. Where the liquid matrix is extruded in monolithic form the thickness of the extruded liquid matrix is typically from 5 mm to 300 mm in depth and typically with a width of from about 5 mm to 300 mm.

Pultrusion

Following extrusion of liquid matrix in monolithic form, continuous fibre is disposed therein under tension. In certain embodiments the process described herein utilises pultrusion for the production of a fused solid of desired length with a constant cross-section, or which has a localized variable cross-section shape introduced at any axial location along the product length, and having continuous fibre disposed within under tension.

In certain embodiments, the fused solid is prepared by pultrusion to form an article with generally rectangular shaped cross-section. It should be understood, however, that the method is applicable to creating articles having any desired cross-sectional shape, including tubes and rods having square, circular, triangular, rectangular trapezoidal, X-shaped, T-shaped, J-shaped, I-shaped or other regular or irregular cross-sectional shape or profile. Cross-sectional shape or profile as used herein, unless otherwise noted, refers to the shape of the pultruded article in a cross-section which is transverse to the pultruded article as it emerges from the pultrusion die.

Typically, where the continuous fibre is provided in the form of strands, the pultrusion apparatus includes a plurality of creels, looms or spools from which the tensioned continuous fibre is supplied. The continuous fibre leaving the creels, looms or spools may subsequently be drawn through a guide which locates and may converge a plurality of strands of continuous fibre. In certain embodiments, the creels, looms or spools are fitted to an adjustable spring loaded axle which may be mounted on a rack system which holds a primary spool with a secondary spool. When the primary spool is becoming empty, the strand of continuous fibre from the secondary spool may be connected to the strand of continuous fibre coming from the primary spool. The secondary spool then becomes the primary spool whilst the previous primary spool is reloaded with a strand of continuous fibre.

The tensioned continuous fibre may be passed through a forming guide which, for example, may comprise one or a plurality of machined plates, sheet metal guides or the like. The guide consolidates the strands of continuous fibre into a pattern in which the continuous fibre will be disposed within the liquid matrix. Typically, tensioned strands of the continuous fibre will be threaded through contoured insertion tubes which dispose the fibres into their positions within the matrix. In one embodiment, the insertion tubes may contain a V-shaped bulbous configuration at one end. The V-shaped bulbous configuration may be used to create channels in the matrix for insertion of the tensioned strands of continuous fibre.

Preferably, each strand of the continuous fibre is tensioned to an amount equivalent to the application of about from 1, 1.5, 2.0, 2.5, 3.0, 3.5 to 4.0 kg of load. The tension may be applied by a hydraulic pulley system. Typically, a spring loaded axle is computer programmable to control the tension. In certain embodiments, hydraulically operated rams via a tension sprocket will maintain a constant tension on the fibres. Such tension in the strands of the continuous fibre assists in maintaining their parallel arrangement and alignment in the fused solid. In addition, by fusing the liquid matrix with the continuous fibre while the continuous fibre is still under tension, the fused solid may possess greater rigidity and strength.

In pultrusion, the liquid matrix and continuous fibre disposed therein may be pulled through a temperature controllable pultrusion die which is capable of undergoing temperature cycling. Heating means and cooling means may be provided to selectively heat and cool the die as required. The pultrusion die may include heating means such as an electrical heater resistance strip. Alternatively, other conventional heating means can be provided such as external platen heaters, infrared heaters, cartridge heaters, quartz heaters, conduits or channels provided in the die parts for circulating a heated fluid, and the like. Suitable cooling means may include conventional cooling means known in the art such as fans, blowers or the like for moving cool air or other cool gases past the outer surfaces of the die. It should be understood that the heating means and cooling means are preferably comprised of a plurality of individually controllable heating and cooling means respectively to facilitate optimal temperature control along the entire length of the die. Typically, the temperature at the entrance point of the pultrusion die will be in the range of from about 170° C. to 190° C. In other embodiments the temperature at the entrance point of the pultrusion die will be in the range of from about 90° C. to 190° C., such as 90° C. to 120° C. Typically, the temperature at the exit point of the pultrusion die will be in the range of from about 25° C. to 50° C.

In one embodiment, spools will initialize the pultrusion process by pulling the matrix and continuous fibrous substance. Typically a first region of the pultrusion die will be of a tapered shape. Tapering of the die will apply pressure to encase the strands of the continuous fibrous substance into the matrix.

Moisture present in the liquid matrix may be drawn off from the matrix by the force of the matrix being pulled through the dies.

Typically a second region of the pultrusion die will contain gripping or pulling means. Typically one or more gripping or pulling means are employed to pass the material through the pultrusion die. The gripping or pulling means may include conventional reciprocating clamp type pullers, which include a lower gripper which is stationary relative to the frame of the puller, and an upper gripper which is movable. Alternatively, a stationary upper clamp and movable lower clamp design may be employed. A reciprocating clamp type puller may be movable in the machine direction to pull the pultruded material through the pultrusion apparatus. A similar or identical reciprocating gripping or pulling mechanism may be situated directly after the first gripping or pulling means such that with alternating cycles the product being pulled through the pultrusion die experiences an essentially continuous motion. More typically, the gripping or pulling means is a continuous tractor mechanism. The tractor mechanism may comprise serrated rollers. Typically, the serrated rollers will be present on all sides of the die. In certain embodiments, the die will have 4 serrated rollers. Typically, the serrated rollers create a non-slip surface.

The fused solid may be pulled from the pultrusion die at a line speed of from about 2.5 cm to about 600 cm per minute, or more typically from about 300 cm to about 500 cm per minute.

After passing through the gripping or pulling means, the fused solid may be cut into individual articles of desired length by a cutting means. The cutting means may be any known means suitable for cutting fused solids, such as a circular saw, band saw, laser or the like.

The process allows any desired length of fused solid comprising a continuous fibrous substance to be drawn from the pultrusion die. The apparatus may be manually controlled. In certain embodiments, the apparatus is computer controlled.

The water content of the fused solid following pultrusion may be controlled by methods including, but not limited to, natural ambient drying conditions or by passing the pultruded material through a heated chamber or a microwave.

In certain embodiments, subsequent processing of the fused solid may be performed, including, but not limited to, coating of the fused solid, printing on the surface of the fused solid, or stacking of the fused solid.

It will be apparent to those of skill in the art that changes may be made to the details of the above-described embodiments of this invention without departing from the underlying principles thereof.

EXAMPLES

Example 1

A Pallet Produced from Fused Solid

Figure 2:
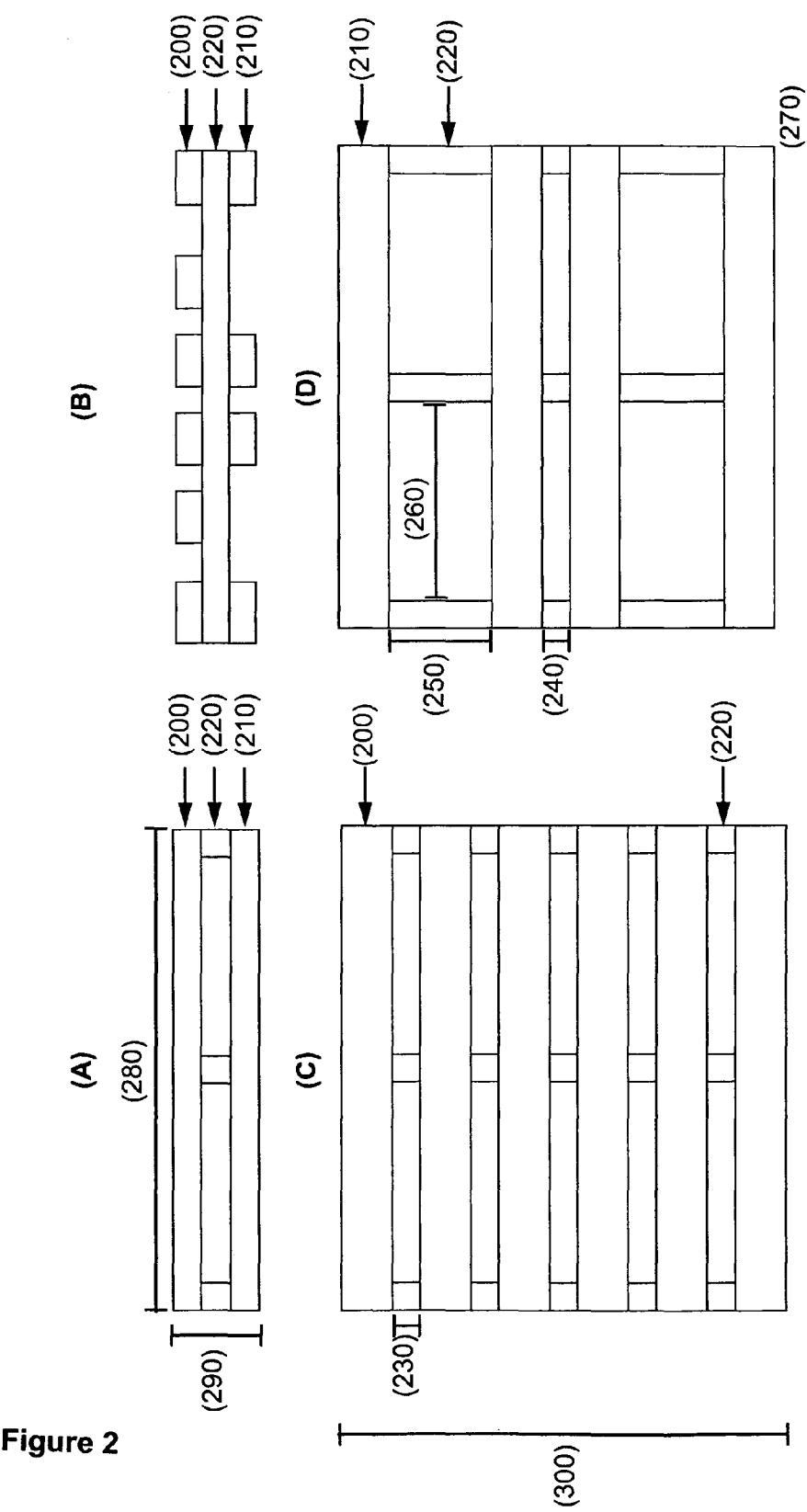
FIG. 2 is a diagram illustrating a pattern for the construction of a pallet (270) comprising top deck boards (200), bottom deck boards (210), and runners (220) each of which may be constructed from fused solid.

The production of a pallet suitable for export shipping using the fused solid described above is set out below. The design of a typical pallet (270) is illustrated in FIG. 2. The dimensions of the pallet illustrated in FIG. 2 are not to scale.

The outside dimensions of the pallet which is described herein are 1140 mm width (280), 150 mm depth (290) and 1140 mm length (300). It will be understood, however, that pallets of other dimensions may be readily constructed.

To form the top deck boards (200) and the bottom deck boards (210) the fused solid is extruded with final cross section dimensions of 125 mm by 18 mm in continuous lengths and cut to size to form planks 1140 mm in length. Typically 6 top deck boards and 4 bottom deck boards are used for each pallet. It is possible to use deck boards of different dimensions in a single pallet. Commonly, for example, pallets may be provided with the outer upper and lower deck boards of greater width, for example by extruding the fused solid with final cross section dimensions of 175 mm by 18 mm.

To form the runners (220) the fused solid is extruded with cross section dimensions of 114 mm by 114 mm in continuous lengths, and cut to size to form runners with a length of 1140 mm. Typically, 3 runners are used per pallet, although additional runners may be used.

It may be advantageous to provide notches in the runners to allow pallet lifters access to one or both of the sides of the pallet, in addition to the access to the front and back. These notches may be created after extrusion of the runners and before or after the runners are cut to length.

To form the pallet, the top and bottom deck boards are fastened to the runners by fastening means. The fastening means may be selected from, but are not necessarily limited to, screws, nails, staples or adhesives or glues. Where the pallet is to be composted at the end of its use, it may be desirable to use a fastening means which is either readily removable or which itself is compostable.

In the example pallet described herein, the deck board spacing (230) between each of the top deck boards is 78 mm, the deck board spacing (240) between the inner two bottom deck boards is 78 mm and the deck board spacing (250) between the inner and outer bottom deck boards is 281 mm. The deck board span (260) between the runners is 399 mm. All of the above mentioned spacing measurements in the pallet are edge to edge.

If the fused solid used in the pallet is surface treated, the surface treatment may be applied to the fused solid prior to assembling the pallet, or after assembly.

If desired, certain fused solid components of the pallet described above may be substituted with similar components of different materials. For example, the runners of the pallet may be substituted with wooden runners.

In the context of this specification, the term "comprising" means "including, but not necessarily solely including". Furthermore, variations of the word "comprising" such as "comprise" and "comprises" have correspondingly varied meanings.

The invention claimed is:

1. A fused solid comprising a matrix which comprises starch and plasticizer, wherein continuous fiber is disposed under tension within the matrix,
wherein the continuous fiber comprises plant textile fiber or animal textile fiber; and
wherein the continuous fibre is substantially dehydrated.

2. The fused solid according to claim 1, wherein the matrix further comprises one or more components selected from polyester, discontinuous fiber, non-fiber filler, foaming agent and oil.

3. The fused solid according to claim 1, wherein the matrix is aerated.

4. The fused solid according to claim 1, wherein the starch is corn starch or a thermoplastic starch derived from corn starch.

5. The fused solid according to claim 1, wherein the plasticizer is selected from the group consisting of any one or more of a dihydric alcohol, a trihydric alcohol, a polyhydric alcohol, lecithin, triethyl citrate, ethylene glycol, propylene glycol, glycerol, a glycerol ester, erythritol, pentaerythritol, sorbitol, a poly glycerol and a poly glycerol ester.

6. The fused solid according to claim 1, wherein the continuous fiber comprises plant textile fiber wherein the plant textile fiber is hemp or jute fiber.

7. The fused solid according to claim 1, wherein the fused solid is biodegradable.

8. A pallet comprising a plurality of top deck boards, a plurality of bottom deck boards and plurality of runners, wherein at least one of the plurality of top deck boards, the plurality of bottom deck boards and the plurality of runners is composed of the fused solid of claim 1.

9. The fused solid according to claim 1, wherein the continuous fiber comprises plant textile fiber wherein the plant textile fiber is hemp bast fiber.

10. The fused solid according to claim 1, wherein the continuous fiber is disposed under a tension equivalent of from about 1 kg to about 4 kg of load.

* * * * *